Figure 1:
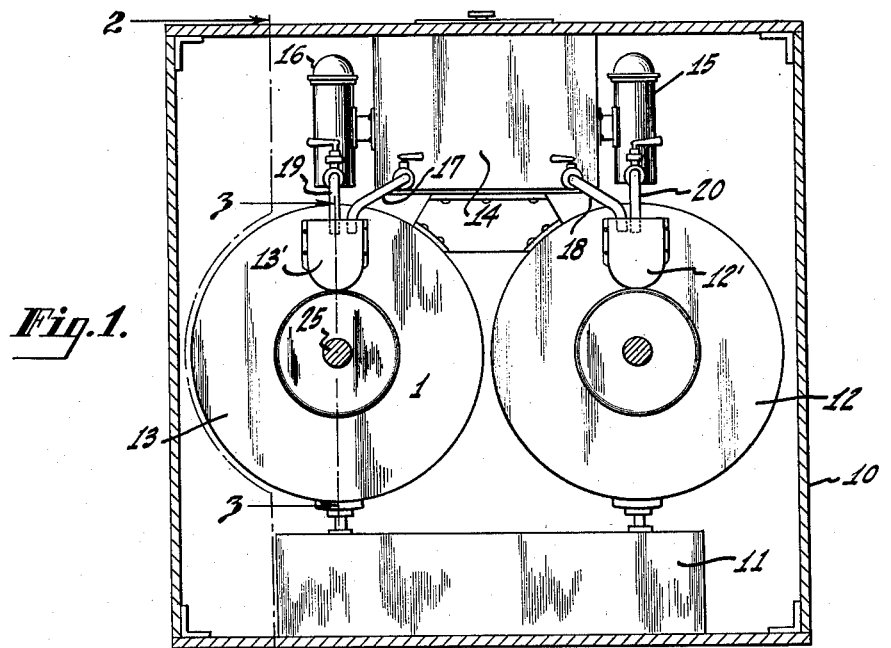

March 6, 1951 W. D. HOUSTON 2,544,162
FREEZER
Filed Dec. 22, 1947 2 Sheets-Sheet 1

INVENTOR
WILBUR D. HOUSTON
BY William A. Zalesak
ATTORNEY

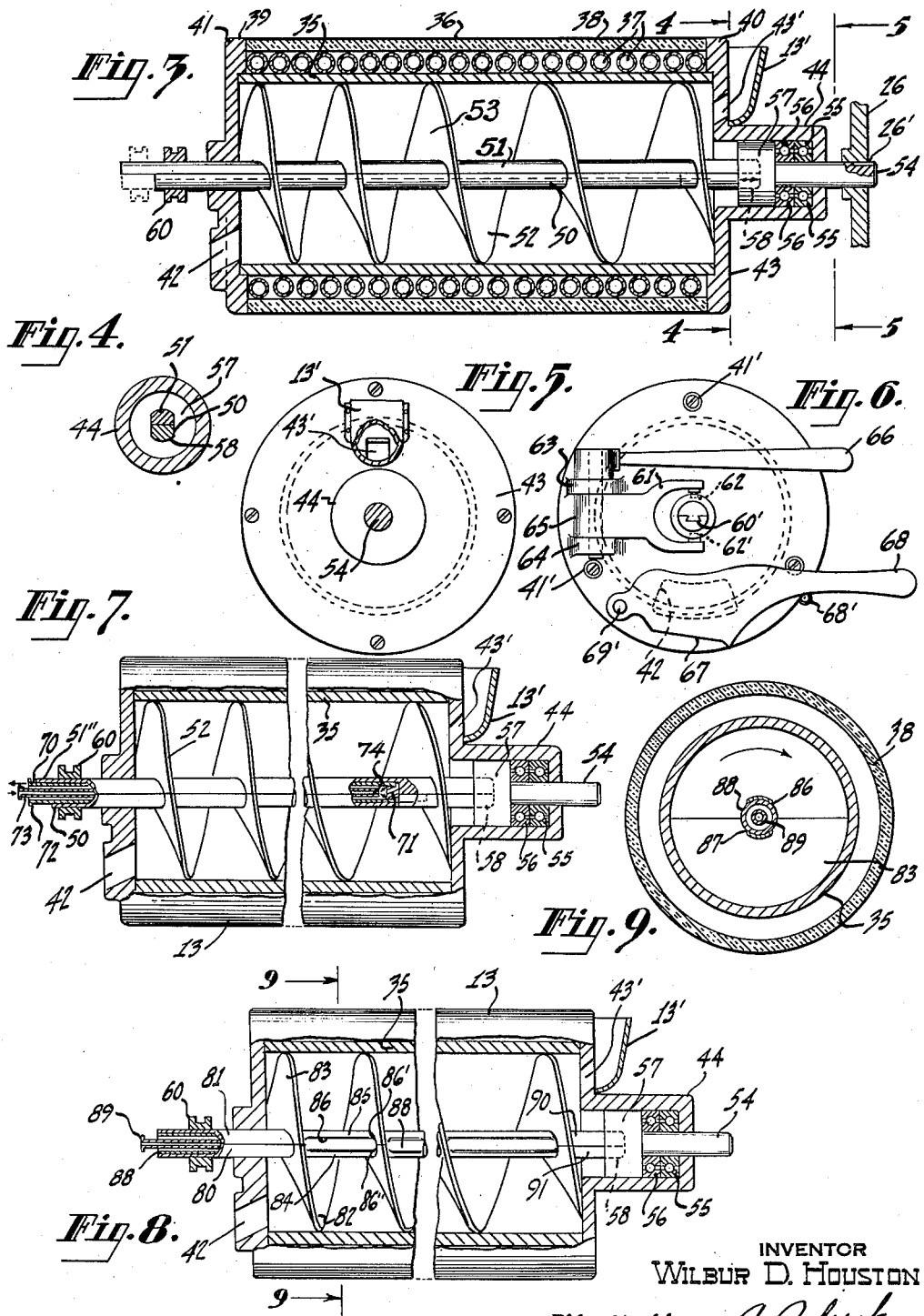

Patented Mar. 6, 1951

2,544,162

UNITED STATES PATENT OFFICE 2,544,162

FREEZER

Wilbur D. Houston, Elizabeth, N. J., assignor of one-half to William C. Newman, Elizabeth, N. J.

Application December 22, 1947, Serial No. 793,143

7 Claims. (Cl. 259—45)

My invention relates to freezers, particularly to a novel freezer for rapidly solidifying liquid such for example as milk or cream for making ice cream.

In one type of conventional freezer the so-called beater or dasher, which is a rotating device within the freezer casing or cylinder and provided with paddles, is depended upon also to serve as a feed screw for directing the frozen material through the freezing chamber or cylinder. However, a screw which provides maximum efficiency for feeding is not the most efficient or desirable device for beating or agitating and producing a fine texture ice cream. Hence it has been necessary to utilize a compromise design for this purpose.

In the art of conveying material by means of a screw conveyer, it is known to utilize a cylindrical casing in which is rotatably mounted a shaft carrying a screw or helix circling about the shaft and secured to it. The screw may be integral with the shaft or may be of one or more sections bolted or otherwise secured to the shaft, but in all the devices known to the art the pitch of the screw is the same throughout its length and the screw is continuous in the sense that the spacing between like points on consecutive threads of the screw is the same throughout the length of the conveyer.

It is also known to the art to utilize a series of disconnected sections of a screw or paddles for agitating and conveying the material, but even in this case the sections of the screw or paddles have the same pitch throughout the length of the conveyer; that is, the paddles are merely discontinuous sections of a single screw of constant pitch.

I have observed that conveyers and agitators of the above character are not entirely satisfactory for several reasons, one of them being that if the screw is continuous the material is advanced in irregular and intermittent batches in accordance with the way it is dumped into the conveyer. This may result in congestion or jams of the material as it is conveyed.

In the devices of the prior art which utilize a conveyer screw built up in sections, it is the usual practice to use conveyer sections or flights of a complete revolution, of a half revolution, and a quarter revolution, but it is apparent that in building conveyers of different lengths that the length of the trough must be so chosen that its length is equivalent to multiples of the space represented by a quarter flight, that is, in choosing the length of the conveyer, the length must be varied in steps equivalent to a quarter turn of the conveyer screw at a time.

It is quite desirable that material being conveyed in a screw type conveyer distribute itself evenly along the length of the conveyer. It is also very desirable, if possible, to agitate and break up the material as it is being conveyed.

In addition conventional freezers, because of their structure, are not readily cleaned out nor rapidly cleaned out, thus slowing up the process of manufacture and increasing the cost of cleaning.

For small freezers where small quantities of ice cream are desired to be manufactured, it is sometimes desirable to manufacture more than a single flavor.

Where a compromise beater and conveyer is utilized a constant pitch screw is normally employed so that the pressure along the screw for feeding the frozen confection is the same throughout. This limits the speed with which the prepared mixture can be ejected from the freezer.

It is also desirable, in the small freezers where the mixture is supplied upon order, that a short period only elapse before delivery after an order is received, to have some means for providing quick or instant freezing and at the same time to provide such a device which has a large capacity to produce large amounts of frozen confection.

It is, therefore, an object of my invention to provide a new and improved design of freezer, particularly of the kind for providing a frozen confection.

Another object of my invention is to provide a freezer having a combination beater and conveyer of improved design.

It is another object of my invention to provide a combination beater and conveyer screw which can be readily converted from an efficient beater to a conveyer and the reverse at will.

Another object of my invention is to provide conveyers which increase the pressure on the prepared confection at the discharge end of the freezing cylinder.

A further specific object of my invention is to provide a conveyer having a variable pitch and which can be readily converted to a beater.

Another object of my invention is to provide an inside and outside freezer with a rotating scraper for the inner cooling tube.

A further object of my invention is to provide a freezer of the kind described which can be readily and quickly cleaned when necessary.

A further object of my invention is to provide a freezer capable of simultaneously providing two or more different flavored confections and providing substantially instantaneous freezing and delivery.

Figure 2:
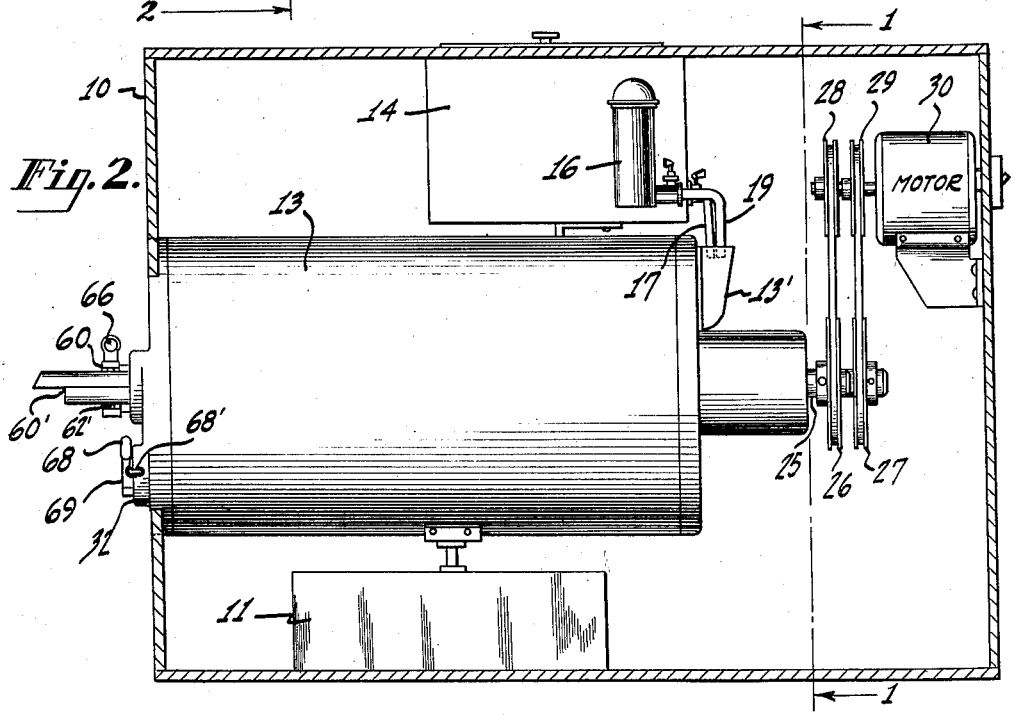

The novel features which I believe to be characteristic of my invention are set forth with particularity in the appended claims, but the invention itself will best be understood by reference to the following description taken in connection with the accompanying drawing in which Figure 1 is a front end view of a freezer made in accordance with my invention, Figure 2 is a transverse longitudinal view of Figure 1 taken along line 2—2 of Figure 1, Figure 3 is a longitudinal sectional view of the freezing cylinder and improved conveyer and beater made according to my invention, Figure 4 is a detail taken along the line 4—4 of Figure 3, Figure 5 is a right end view of Figure 3, Figure 6 is the left end view of Figure 3 and Figure 7 shows a modification of the arrangement shown in Figure 3, Figure 8 is a longitudinal partial section of a further modification of my invention, and Figure 9 is a section along the line 9—9 of Figure 8.

In accordance with my invention I provide a freezing machine employing my invention comprising an outer casing 10 enclosing a compressor 11 and freezing units 12 and 13 connected to said compressor by appropriate fluid conductors. Each of these units is provided with a guiding funnel 12' and 13' into which the liquid to be frozen is fed from container or tank 14 through conduits 17 and 18. The flavors are directed into the funnels 12' and 13' from containers 15 and 16 by means of fluid conductors 19 and 20. The other ends of the freezing units extend to the outside of the casing 10 and are provided with proper outlets and closure members which will be described below.

The freezer chambers contain the feed screws and beaters to be described which may be driven by means of shafts, such as 25, by means of the pulleys 27 and 26 coupled to driving motor 30 by means of belts appropriately connected over motor pulleys 28 and 29. In operation the freezing fluid is fed from the compressor 11 to jackets and other portions of the freezing cylinders 12 and 13 to extract heat from the liquid being frozen.

To obtain a better understanding of my invention, reference may be had to Figure 3 showing details of construction of a freezing cylinder and combined feed screw and beater or dasher made according to my invention and enclosed within the freezing cylinder.

The freezing cylinder 35 may be provided with flanges 39 and 40 at the ends thereof and a casing 36 enclosing the cooling coil 37 contacting the cylinder 35 and heat insulated by means of the insulation 38. The ends of the casing are closed by means of the cylinder heads 41 and 43 retained by screws 41', the cylinder head 43 being provided with an inlet 43' and the cylinder head 41 with the delivery port 42, which is closed in a manner to be described below. A chute 13' is secured to the cylinder head 43 to direct the liquid to be frozen and the flavor into the interior of the freezing cylinder 35.

The cylinder head 43 is also provided with a boss 44 for supporting the drive shaft 54 on the two roller bearings 55 and 56, the ends of the drive shaft 54 being provided with a cup-shaped member 57 provided with the cup-shaped recess 58, the transverse section of which is best shown in Figure 4, and into which the ends of shaft 50 and 51 extend. The flange 41 is provided with a conventional bearing surface through which the other ends of the feed screw of the conveyers and beater shaft extend.

In accordance with my invention the combined conveyer and beater comprises a split shaft having the two halves 50 and 51 upon which are mounted the screw portions 53 and 52, which are shown in registering position to provide a feed screw for directing frozen material from right to left to the exit port 42. It will be noted that the threads have a smaller pitch at the left end than at the right end, causing a greater pressure and faster delivery to be applied to the frozen confection as the material reaches the left hand end. The explanation for this is that the volume at the entrance between the same portions spaced one turn apart is greater than at the delivery end so that a smaller volume of mixture is delivered at the port, this being similar to the increased speed of water through a narrow aperture, such as a hose nozzle as compared with the body or portion of the hose proper. This has the advantage of providing greater pressure to drive the mixture through and permits harder freezing than otherwise would be possible in equipment of this kind.

The portion 50 of the shaft is provided with a collar 60 secured thereto but slidable with respect to the portion 51. The cup portion 57 of shaft 54 is provided with a recess 58 deep enough to still contact both ends of the split shaft 50, 51 in either position of the split shaft.

As will be noticed in Figure 6 the collar 60 is engaged by U-shaped member 61 having pins 62 and 62' riding in the collar 60 permitting rotation of the collar when driven by shaft 54. This U-shaped member is mounted on pin 65 supported in bracket 63 and 64 and manipulated by lever 66 to cause longitudinal movement of the portion 60 of the shaft. It may be keyed at 60' as shown in the figure or some other coupling arrangement may be employed for permitting relative longitudinal movement of the two parts of the shaft. When in the dotted position the two halves are displaced so that the screw portions act as dashers. The exit port 42 is closed by means of the closure member 67 operated by handle 68 and pivoted at 69', a spring catch 68' holding member 67 in closed position.

For clean-out purposes cylinder head 41 may be readily removed by loosening screws 41' and the entire screw may be readily removed with the cylinder head by slipping the right hand ends from the coupling member 57.

If it is desired to more rapidly freeze the liquid within the freezing cylinder 35, the modification shown in Figure 7 may be employed. In this case split shaft 50'' and 51'' is mounted to rotate about tubular member 70 closed at one end by plug 71 and having flange 72 for coupling to a source of coolant. It employs inner tube 73 open at end 44 to permit delivery of the coolant through the inner tube to the open end and around the outside of the tube for quickly cooling the shaft and the combined beater and conveyer screw threads 53. This devices may also be utilized for heating the shaft to loosen frozen confection from the shaft when so desired.

A still further modification of my invention is shown in Figures 8 and 9 where I employ a hollow split shaft having elongated apertures for providing longitudinally extending scrapers between the screw elements.

Referring to Figure 8, mounted within the casing 35 is a split shaft screw arrangement comprising the portions 80 and 81 to which are attached the complementary screw portions 82 and 83. By removing longitudinally extending portions of the shaft between adjacent screw elements I am able to provide longitudinally extending webs having scraper edges, such as 86 and 87 (see Fig. 9) which upon rotation about the hollow tubular member 88 which does not rotate can scrape the frozen liquid from the inner freezing tubular member 88 as well as from the interior of the casing 35. The ends of the shaft 90 and 91 are received within a driving coupling member as before. The inner tubular member 89 may introduce the heating or cooling medium.

As pointed out above in referring to the modification shown in Figs. 8 and 9, the tubular members 88 and 89 do not rotate and the internal structure is the same as disclosed in Fig. 7, that is, the coolant is injected through the inner tubular member 89 and flows into the outer tubular member 88 from the inner end of member 89 and then outwardly from the tubular member 88 in the same manner as is done in the construction shown in Fig. 7. Thus, the shaft elements 80 and 81 are free to rotate in their bearings in the casing and on the tubular member 88 and have longitudinal movement with respect to member 88. Referring to Fig. 9, as the scraping edges 86 and 87 rotate on the outer tubular member 88, they scrape from it any frozen liquid adhering to this tubular member.

In addition to the elements providing scraping edges 86 and 87, the portions of the edges of the screw elements in contact with the tubular member 88 may also be provided with scraping edges, for example, along the portions 86' and 86''. A collar 60 which may be attached to either half of the hollow shaft may be utilized for adjusting the position of the screw portions relative to each other to provide either a feed screw or a beater as above described.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A freezer unit having a freezer compartment, a combined beater and conveyor rotatably within said compartment, said conbined beater and conveyer comprising a screw shaft split longitudinally and including a pair of relatively longitudinally movable shaft parts, each of said parts carrying complementary screw elements which when in registering position provide a conveyer and when in non-registering position provide a beater, and means for causing relative movement of said shaft parts.

2. A freezer unit having a freezer compartment, a combined beater and conveyer rotatable within said compartment, said combined beater and conveyer comprising a screw shaft split longitudinally and including a pair of relatively longitudinally movable shaft parts, each of said parts carrying complementary screw elements which when in registering position provide a conveyer and when in non-registering position provide a beater, and means for causing relative movement of said shaft parts, one end of said compartment providing a bearing, a driver and coupling member extending through said bearing, said coupling member being provided with an elongated recess for receiving one end of each of said shaft parts, and means at the other end of said shaft parts including a collar fixed to one of said shaft parts and a yoke engaged with said collar, and a lever for operating said yoke for causing relative movement of said shaft parts.

3. A freezer unit comprising a cylinder, a shaft rotatable within said cylinder and a screw formation extending between said shaft and the inner wall of said cylinder, means for delivering a liquid to one end of said screw formation, said freezer discharging a frozen confection at the other end of said screw formation, said shaft comprising a pair of longitudinally movable parts each carrying a complementary portion of the screw for providing a continuous screw or a non-continuous screw to act as a conveyor or as a beater.

4. A freezer unit comprising a cylinder, a shaft rotatable within said cylinder and a screw formation extending between said shaft and the inner wall of said cylinder, means for delivering a liquid to one end of said screw formation, said freezer discharging a frozen confection at the other end of said screw, said shaft being split longitudinally and comprising a pair of longitudinally movable parts each carrying a complementary portion of the screw for providing a continuous screw or a non-continuous screw to act as a conveyor or as a beater, said split shaft being hollow and having therewithin concentric tubular members, the inner one of which is open at one end for directing a fluid therethrough into the outer tubular member.

5. A freezer unit comprising a cylinder, a shaft rotatable within said cylinder and a screw formation extending between said shaft and the inner wall of said cylinder, means for delivering a liquid to one end of said shaft, said freezer unit discharging a frozen confection at the other end of said shaft, said shaft being split longitudinally and comprising a pair of longitudinally movable parts each carrying a portion of the screw for providing a continuous screw or a non-continuous screw to act as a conveyor or as a beater, closure elements for the ends of said cylinder, bearings in said closure members, one end of said shaft extending through one of said closure members and supported in one of said bearings, a driving coupling member rotatable in the other bearing and receiving the other end of said shaft.

6. A freezer unit including a cylindrical casing, a hollow tubular member extending within said casing and a combined feed screw and beater rotatably mounted on said tubular member and having a hollow shaft, screw portions mounted on said shaft and extending between said shaft and the inner wall of said casing, said shaft having longitudinally extending apertures between adjacent portions of the screw elements whereby longitudinally extending webs are provided having longitudinally extending scraping edges for removing frozen material from said tubular member, said shaft being split longitudinally and comprising a pair of parts relatively movable longitudinally of each other, each part carrying a complementary portion of the screw for providing a continuous screw or a non-continuous screw to act as a conveyor or beater.

7. A freezer unit including a cylindrical casing, a hollow tubular member extending within said casing and a combined feed screw and beater rotatably mounted on said tubular member and having a hollow shaft, screw portions mounted on said shaft and extending between said shaft and the inner wall of said casing, said shaft having longitudinally extending apertures between adjacent portions of the screw elements whereby longitudinally extending webs are provided having longitudinally extending scraping edges for removing frozen material from said tubular member, portions of said screw elements in contact with said tubular member also having scraping edges, said shaft being split longitudinally and comprising a pair of parts relatively movable longitudinally of each other, each part carrying a complementary portion of the screw for providing a continuous screw or a non-continuous screw to act as a conveyor or beater, and means for causing relative longitudinal movement of said parts.

WILBUR D. HOUSTON.

REFERENCES CITED

The following references are of record in the file of this patent:

UNITED STATES PATENTS

| Number | Name | Date |
|---|---|---|
| 896,551 | Jurgens | Aug. 18, 1908 |
| 2,080,971 | Oltz | May 18, 1937 |
| 2,218,119 | McAllister | Oct. 15, 1940 |